UNITED STATES PATENT OFFICE.

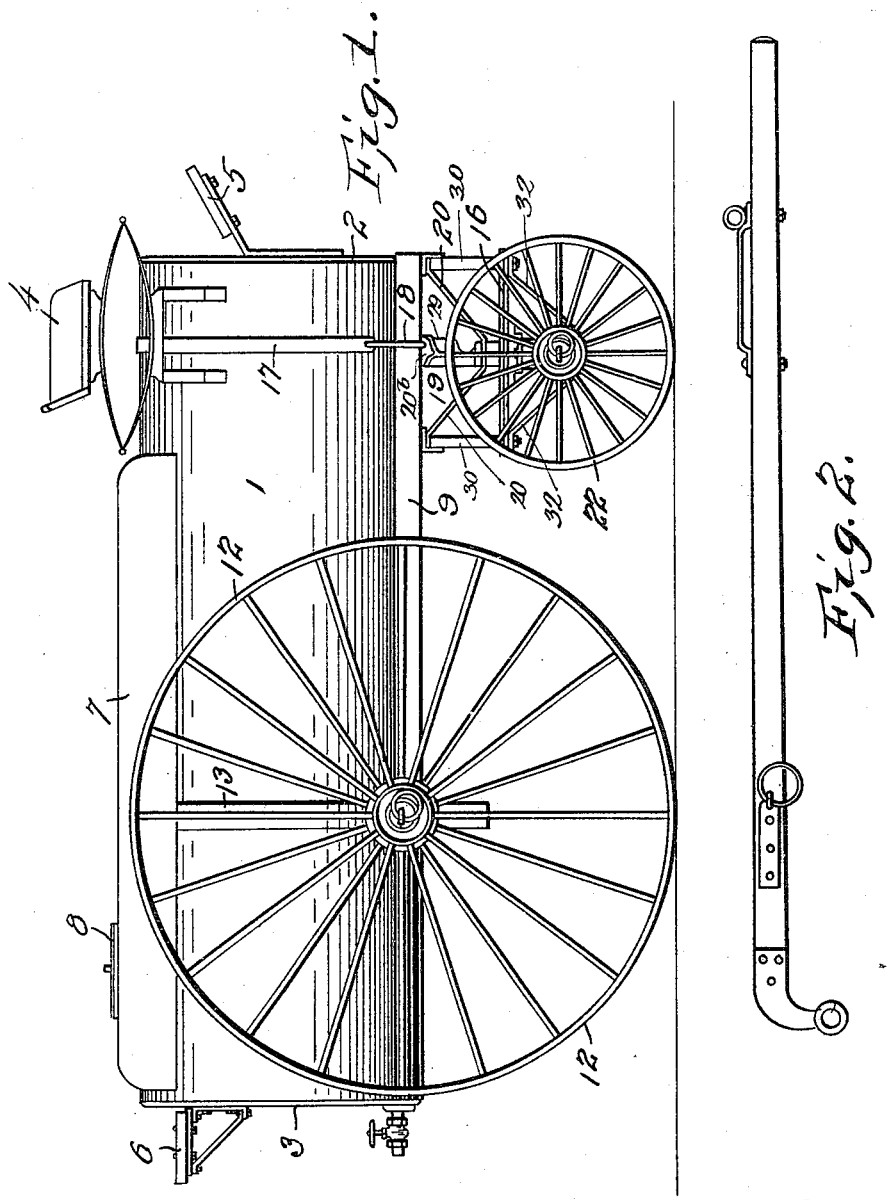

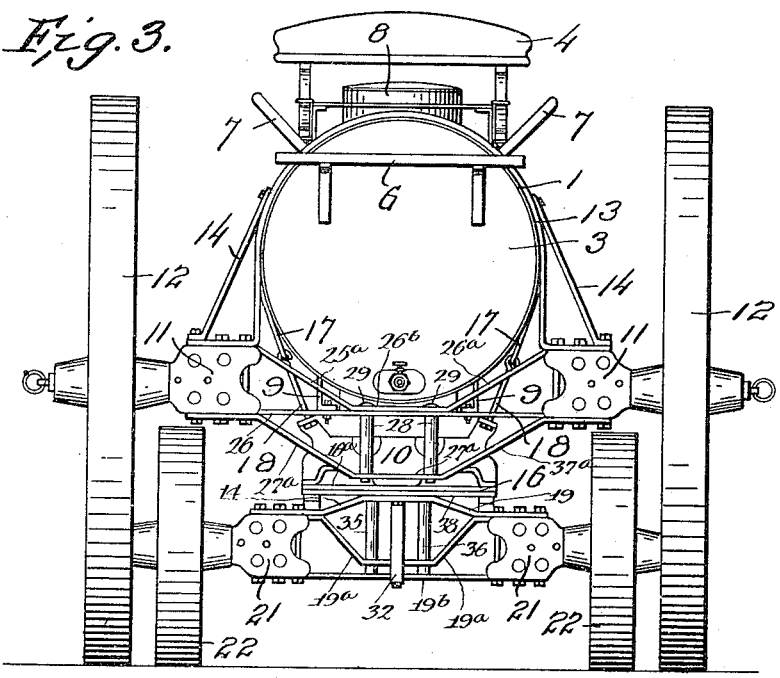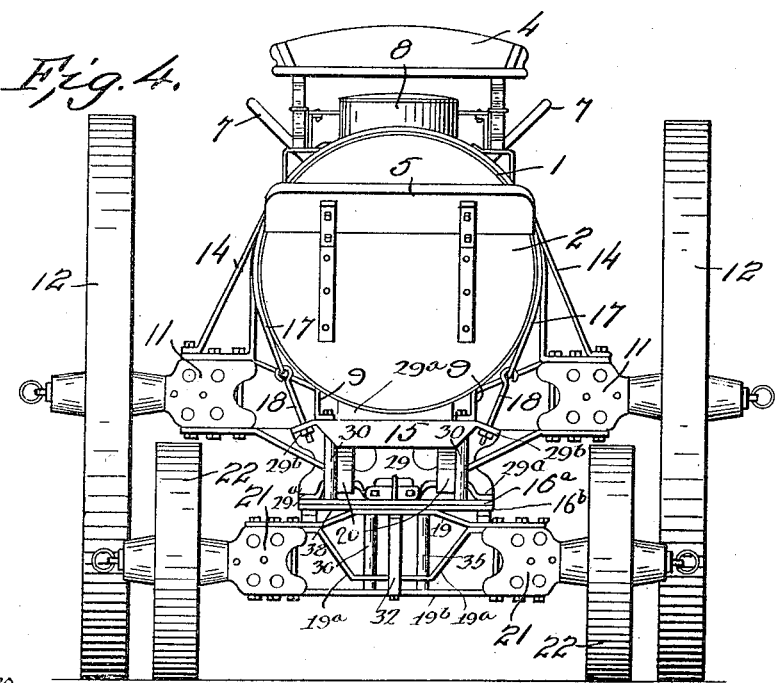

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

PORTABLE TANK.

1,137,733.        Specification of Letters Patent.        Patented May 4, 1915.

Application filed October 14, 1907, Serial No. 397,307. Renewed January 21, 1911. Serial No. 603,954.

*To all whom it may concern:*

Be it known that I, JOHN B. BARTHOLOMEW, citizen of the United States, residing at Peoria, in the county of Peoria and State of Illinois, have invented certain new and useful Improvements in Portable Tanks, of which the following is a specification, reference being had therein to the accompanying drawing.

My invention relates to vehicles of the class characterized by this that each comprises a comparatively large water tank and means for mounting and transporting it.

Among the several objects aimed at are these: To provide metallic axle frames and mountings for such a tank vehicle; to so construct and arrange the parts of the axle frames that they shall be strong but light and capable of having the tank bound firmly to them; and to so shape and relate the several parts of the structure, as an entirety, that when the vehicle is to be shipped or transported, otherwise than upon its own wheels, the component parts can be crated or packed in compact or secure form for such shipment.

Figure 1 is a side elevation of a tank vehicle embodying my improvements. Fig. 2 is a side elevation of one of the draft shafts on an enlarged scale. Fig. 3 is a rear elevation of the vehicle. Fig. 4 is a front elevation.

1 is the tank proper provided with the usual front head 2 and rear head 3, the latter being removably secured to the barrel for a purpose to be hereinafter referred to. The usual seat 4, foot boards 5 and 6, side boards 7 and filling opening 8 may also be provided.

I provide a steel frame work for the tank as follows: 9, 9 indicate angle bars arranged longitudinally of the vehicle and having their upper edges fitted snugly to the lower portion of the tank. At the forward ends they rest upon and are bolted to short transverse angle bars 15, 15. At their rear ends they are supported upon a rear axle structure formed as follows: 11, 11 are cast metallic carrier blocks, each formed or provided with an outwardly extending spindle for receiving one of the large rear wheels 12, 12. These blocks are formed with grooves or flanged edges at the top and bottom. 25 is a steel bar, the ends of which are placed on the top of, and in the top grooves in, the carrier blocks 11, 11. This bar is bent to have the inclined parts $25^a$ and the central horizontal part $25^b$, the latter being situated nearly in the horizontal planes of the bottom edges of the carrier blocks 11, 11. 26 is a straight horizontal steel bar which, at its central part, is rigidly connected to the lowered central part $25^b$ of the upper axle bar, this part 26, at its ends, being fitted into the grooves in the lower edges of the carrier blocks 11, 11. 27 is a steel bar which is shaped to be approximately parallel to the bar 25, having downwardly inclined parts $27^a$ and a central lower part $27^b$. The central part of the bar 27 is spaced from the central parts of the bars 25 and 26 by tubular posts 28 and the three bars are at their centers firmly bound together by bolts 29. It will be seen that a very light but exceedingly strong truss axle is thus provided for the rear part of the tank. The rear ends of the longitudinal sill bars 9 rest upon the tie-bar 26. The forward cross-bars 15, above referred to, are joined by two truss bars 20. Midway of the cross-bars 15, there is a cross-plate or carrier block 29 which at the center is curved to conform to the tank, as at $29^a$. At the ends it is formed with ears $29^b$ at the top, and at the bottom has feet or pedestals $29^c$. These pedestals rest upon, and are secured to, the upper ring element $16^a$ of a fifth wheel structure. The side bars 9 and the ring element $16^a$ are spaced apart by tubular posts 30, but at the same time are firmly clamped together by means of bolts passing through the posts.

The framework just described rests upon the front axle, which is constructed as follows: At each end there is a carrier block 21 of cast metal having spindles for the front wheels 22. These carry a truss frame having the top or upper element 19, the intermediate or inclined element $19^a$, and the bottom element $19^b$. With these there are combined the vertical posts 35 and 36 which space the horizontal elements from each other and form a rigid truss structure. 38 is the lower ring of the fifth wheel element and is supported upon the front axle, proper, just described. The front and rear parts of the ring are carried by a bent brace bar 32, which at the center is secured to the tie-bar 19$^b$ of the truss axle.

The lower middle part of the carrier block 29 rests upon the front axle and the parts may be held in vertical alinement by any suitable means for performing the function of a king bolt. The front axle is well supported or braced in its swinging movement by the wide fifth wheel structure.

The front part of the tank is firmly bound to the upper part of the fifth wheel by means of the flexible steel band 17 and the binding bolts and nuts at 18. The rear part of the tank is securely clamped in position on the rear axle by means of the band 13 and the brace 14. The band 13 is brought down at its ends vertically and is bolted to the upper edge or face of the carrier blocks 11; the brace 14 being secured to the blocks at points farther out and extending outward at an inclination, the upper ends being fastened to the band.

While the rear wheels are made exceedingly high, the center of gravity of the load is kept relatively low by use of the trussed rear axle having its middle part considerably depressed, the upper or bolster part of the fifth wheel structure being made rather high so as to support the front end of the tank at the same elevation as its rear end. The rear axle structure might conceivably be dropped still lower in its middle part so as to bring the tank lower, but I prefer the construction and relative proportions shown, because a rear axle, having its middle part depressed about as much as shown in the drawings, can have a construction that is at once simple and strong, and, at the same time, the front bolster structure need not be made unduly high. Furthermore, the mounting of the tank at about the elevation shown makes it possible to swing the front wheels freely under the tank body.

To the front axle are connected shafts such as shown at 23, preferably shorter than the tank and adapted for the attachment of a single horse. Each shaft is, however, provided with one or more hitching rings 24 to facilitate the hitching of additional horses. And similar rings are secured to other points of the mounting, as at the axle tips, for a like purpose. In new and comparatively undeveloped countries, the roads are apt to contain ruts, sloughs, and other places of difficult passage. The high, broad-tired wheels which I provide and which I arrange near the center of gravity of the tank so that they carry the greater portion of the load, permit easy passage over such spots, while the plurality of hitching rings provide for the ready temporary attachment of additional horses.

The structure, as an entirety, can be readily and rapidly taken apart, the tank can be freed entirely from the supporting framework and removed. When the parts are made in the way shown in the drawings, the rear wheels 12 have a diameter substantially twice that of the tank. The front wheels 22 are of such diameter that the front axle can be readily turned so as to bring these wheels under the tank, permitting turning on very short curve, and, moreover, the front wheels can, when removed, be easily placed in the interior of the tank. The other parts, such as the side angle bars 9, 9, the upper frame of the fifth wheel, the rear axle, and the tongue or draft shaft, can be readily detached and placed within the tank. Structures of this class are now shipped long distances, not only from one point to another in this country, but from this country to different parts of the world. When they are made in the way described, the entire vehicle can be transported as two packages, one comprising the rear wheels and the other comprising the tank, and all the remaining parts stored within it. This greatly reduces the expense and inconvenience incident to shipment.

At the destination the mountings and fittings are removed from the interior of the tank and set up and the loose tank is then permanently secured in place by means of the clamping bands 13 and 17.

What I claim is—

1. In a portable tank, the combination of a front axle, a rear axle, frame parts connecting said axles, said axles and frame parts being detachably secured together, front and rear wheels on said axles, respectively, and a tank part proper detachably mounted on the axles and frame parts, one of the heads of said tank being removable, and the said axles, frame parts and front wheels, when disassembled, being so proportioned with respect to the tank that all of the said parts can be crated within it.

2. In a portable tank, the combination of a tank part proper having one of its heads removable, front and rear axles, a frame connecting the axles, wheels on the front axle of relatively small diameter, and wide tired wheels on the rear axle having a diameter approximately twice that of the tank and being disposed near the center of gravity of the tank, the parts of the frame, the axles and front wheels being detachably connected and adapted, when disassembled, to be crated in the tank.

3. The combination of the normally horizontal cylindrical tank, the rear axle upon which the tank is supported, the large wheels on the rear axle having a diameter approximately twice that of the tank, the front wheels having a diameter half that of the rear wheels and less than the diameter of the tank so as to be adapted to be placed therein when detached, and means comprising a fifth wheel structure and a front axle for supporting the front end of the tank on the front wheels at an elevation such that the wheels can be turned under it.

In testimony whereof I affix my signature, in presence of two witnesses.

JOHN B. BARTHOLOMEW.

Witnesses:
A. L. GREGORY,
G. W. BERRY, Jr.

Copies of this patent may be obtained for five cents each, by addressing the "Commissioner of Patents, Washington, D. C."